US007046958B2

(12) United States Patent
Brynielsson

(10) Patent No.: US 7,046,958 B2
(45) Date of Patent: May 16, 2006

(54) METHOD AND SYSTEM FOR RADIO COMMUNICATION WITH MOBILE UNITS

(75) Inventor: Thore Brynielsson, Kullavik (SE)

(73) Assignee: AB Tryggit, Kullavik (SE)

( * ) Notice: Subject to any disclaimer, the term of this patent is extended or adjusted under 35 U.S.C. 154(b) by 349 days.

(21) Appl. No.: 10/239,577

(22) PCT Filed: Mar. 28, 2001

(86) PCT No.: PCT/SE01/00670

§ 371 (c)(1),
(2), (4) Date: Sep. 24, 2002

(87) PCT Pub. No.: WO01/76105

PCT Pub. Date: Oct. 11, 2001

(65) Prior Publication Data

US 2003/0060159 A1   Mar. 27, 2003

(30) Foreign Application Priority Data

Mar. 29, 2000 (SE) .................................... 0001144

(51) Int. Cl.
*H04B 7/15* (2006.01)
(52) U.S. Cl. .................... 455/11.1; 455/435.2; 455/464
(58) Field of Classification Search ............... 455/11.1, 455/430, 403, 414.1, 424, 456.5, 464, 435.2
See application file for complete search history.

(56) References Cited

U.S. PATENT DOCUMENTS

| | | | | |
|---|---|---|---|---|
| 5,101,267 A | * | 3/1992 | Morales-Garza | 725/65 |
| 5,384,565 A | * | 1/1995 | Cannon | 340/7.52 |
| 5,388,101 A | * | 2/1995 | Dinkins | 725/62 |

(Continued)

FOREIGN PATENT DOCUMENTS

DE  19653726  7/1998

(Continued)

OTHER PUBLICATIONS

Kazumi Saito: "Taxi AVM System"; Patent No. JP3-236638; Abstract Only.

(Continued)

*Primary Examiner*—CongVan Tran
(74) *Attorney, Agent, or Firm*—Harness, Dickey & Pierce, P.L.C.

(57) ABSTRACT

The invention concerns a system and a method of radio communication between a plurality of mobile units (6) and a stationary system (1, 3, 12, 14) comprising one or several transmitter units (3), wherein radio communication to one or several mobile units (6) is effected by broadcasting from one of said emitter units (3) on a first, public frequency. The stationary system further comprises a plurality of stationary receiver units (12), said units being connected to a central unit (1) via a common data communication network (14), radio communication from the mobile units (6) being effected by transmitting on a second, public frequency a burst of radio messages (25) that are receivable only by a small number of receiver units (12). From the receiver units (12) the messages are forwarded via the data communication network (14) to the central unit (1), which selects one of the forwarded messages and reads the data contained in the message. The system in accordance with the invention therefore does not require that designated communication paths be established with each communicating unit, and since only a small number of receiver units (12) receive each transmitted message, all messages may be transmitted on the same frequency. Alternative frequencies could however be utilised, for example when longer messages are to be transmitted.

17 Claims, 2 Drawing Sheets

U.S. PATENT DOCUMENTS

| | | | |
|---|---|---|---|
| 5,392,353 A * | 2/1995 | Morales | 380/211 |
| 5,627,528 A * | 5/1997 | Kuznicki | 340/7.22 |
| 5,633,872 A | 5/1997 | Dinkins | |
| 5,649,300 A | 7/1997 | Snyder et al. | |
| 6,094,487 A * | 7/2000 | Butler et al. | 380/270 |
| 6,330,590 B1 * | 12/2001 | Cotten | 709/206 |
| 6,370,157 B1 * | 4/2002 | Boccuzzi et al. | 370/482 |
| 6,453,171 B1 * | 9/2002 | Auvray | 455/552.1 |
| 6,542,741 B1 * | 4/2003 | Wallstedt et al. | 455/434 |
| 6,675,009 B1 * | 1/2004 | Cook | 455/420 |
| 6,729,929 B1 * | 5/2004 | Sayers et al. | 455/446 |

FOREIGN PATENT DOCUMENTS

JP          07336771 A  * 12/1995

OTHER PUBLICATIONS

Endou Akira et al; "Communication System in Bus Location System"; Patent No. JP58062944; Abstract Only.

Kaneko Eiji; "Simple Bus Locating System"; Patent No. JP10011699; Abstract Only.

* cited by examiner

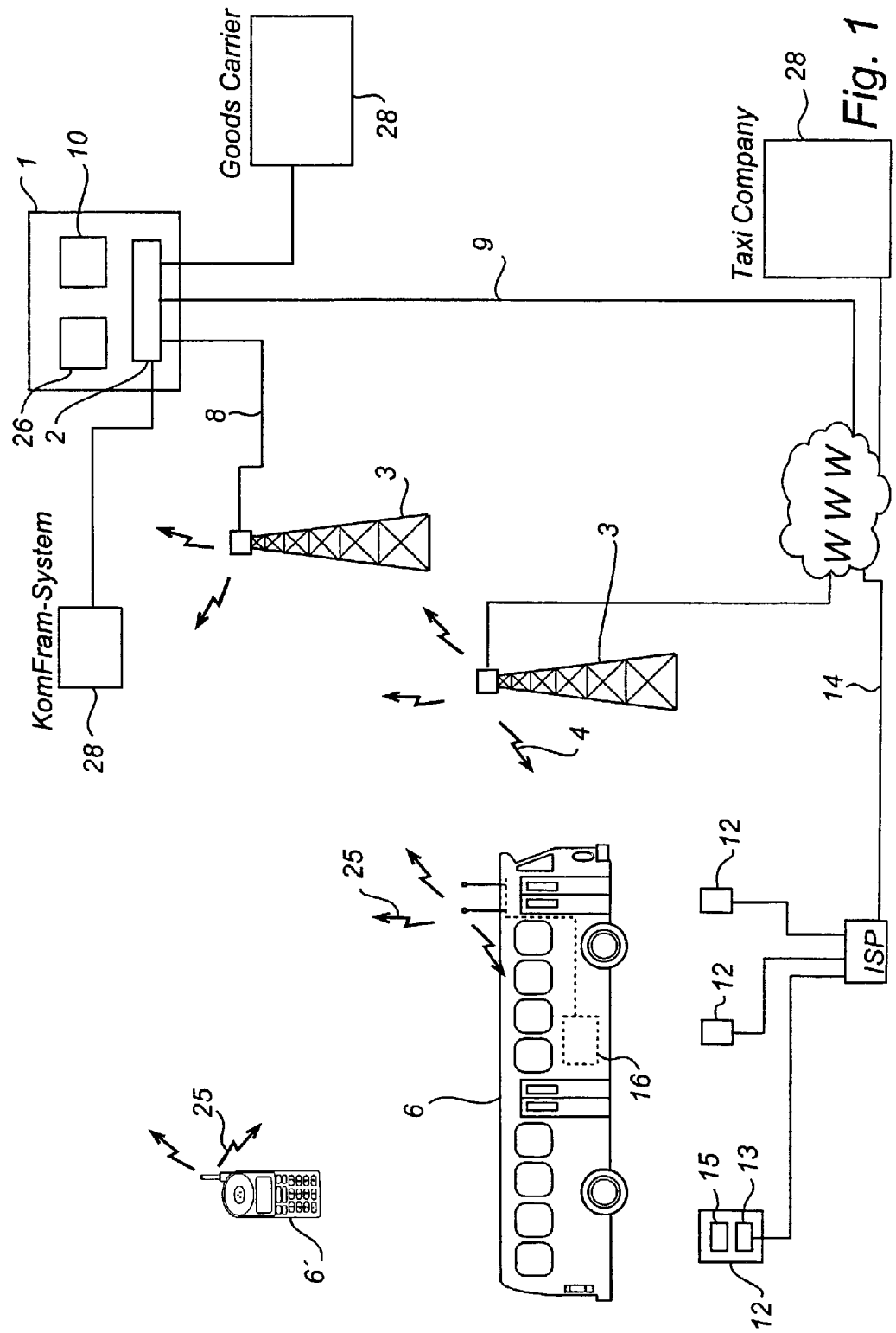

METHOD AND SYSTEM FOR RADIO COMMUNICATION WITH MOBILE UNITS

TECHNICAL FIELD

The present invention relates to a method for radio communication with mobile unit, such as different kinds of vehicles. The invention likewise concerns a system for implementation of the method.

BACKGROUND OF THE ART

In systems comprising several mobile units there is often a need for inter-communication between a central system and the mobile units of the system. One example is public transportation traffic routing and information systems, according to which buses deliver brief reports each time they leave a bus stop, for example. Another example is systems for managing commercial traffic according to which lorries and taxis for instance deliver brief reports on their positions and/or reports on accomplished commissions. A typical feature of systems of this kind is that more data is transmitted from the vehicles to the central system than the other way around, and that comparatively brief messages, normally in the magnitude of some hundredths of data bits, are communicated.

According to prior-art technology, a method usually is used according to which a designated path for communication with one of the vehicles is established and according to which information may then be transmitted on that communication path, such as an individually allocated radio channel at the vehicle's disposal during a limited time interval. One of the following two methods usually is employed to determine if and when such a communication path is to be established, viz.

the central system continuously and sequentially polls all vehicles to ascertain whether any one of the vehicles is in possession of information that is to be forwarded to the central system, via a public channel in the system the vehicles call the central system when they are in possession of information that is to be forwarded to the base station (i.e. an incident-controlled system).

When the base station has become aware in anyone of these ways that a specific vehicle wishes to communicate, a communication path may be established in some prior-art manner, for instance by allocating to the vehicle a specific radio channel, which is at the disposal of the vehicle for a sufficient length of time to allow the message to be forwarded to the base station and possibly also an acknowledgement message be returned from the base station.

One problem encountered with this technology is the lapse of time before it becomes possible to determine which units are in possession of information to be forwarded. Polling, which is a common method used in public transportation systems, is extremely time-consuming, when a large number of vehicles are included in the system. Quite simply, the inquiries to each discrete vehicle are sparse and infrequent, one consequence of which is that important information may be delayed and if it comes to the worst lack interest by the time it reaches the intended party.

This problem has become particularly acute in conjunction with traffic routing and information systems of the kind that continually gather and provide the passengers with information on the expected arrival times to the various stops. The demands from the systems on reliable and rapid information from the vehicles thus are high, a goal that complex polling routines make it difficult to achieve.

Another problem is that each communication path that is established occupies a part of the (available?) frequency space. Thus, the number of communication paths that can be established simultaneously is limited, which considerably restricts the flexibility and performance of the system. Prior-art systems, such as Mobitex and Tetra, need a comparatively large number of frequencies to achieve the required performance. In most countries, the frequency space is very restricted, and for example public transportation systems often are allocated only a few channels within a narrow frequency band. Obviously, the problem becomes even more serious if the system is to be used for other kinds of traffic as well, such as trucks, taxis, and emergency vehicles and other service cars and the like.

Yet another problem is that a considerable proportion of the available radio capacity of prior-art systems is utilised for administration purposes and for allowing time for switch-overs between transmission and reception in conjunction with the establishment of a communication path with a specific vehicle or with the forwarding and acknowledgement of a message.

SUMMARY OF THE INVENTION

The object of the present invention is to obviate the above problems and to establish radio communication with several mobile units without need for the establishment of a specific communication path in each individual case.

Another object is to provide a method and a system for transmission without delay of information from several mobile units to a stationary system.

These and other objects are achieved by means of a method as defined in the independent claim 1 and by means of a communication system as defined in the independent claim 9.

In accordance with the teachings of the invention, radio communication from the mobile units thus is made possible without it being necessary to establish designated communication paths. Instead, the mobile units transmit bursts of identical messages that are received by several receivers located along the path of travel of the mobile unit. It is worth noting that the messages thus are received by only a small number of the receivers, which is ensured by the location of the receivers and by the power of the transmission. Receivers having directional aerials or being located close to the ground or to one side of a building for example are only able to receive messages from mobile units within a limited area. In the same manner, messages transmitted at low power can be perceived only by receivers that are located comparatively close to the transmitting mobile unit.

Consequently, it is important to adapt the location of the receiving units and the power of the transmission of the mobile units in a way ensuring that a message emitted from a specific mobile unit is perceived by a suitable number of receiving units, and that a receiving unit is able to perceive messages from a suitable number of mobile units in its vicinity. This is a central concept of the invention, since it ensures that several mobile units are able to simultaneously transmit messages that are received by different groups of receivers. For satisfactory functioning of the system a comparatively large number of receivers thus are required, said receivers being dispersed over the entire intended area of coverage of the communication system.

The invention makes it possible to establish an extensive communication network by utilising only two public frequencies, viz. one for high-power transmission of broadcast messages to the mobile units, and one for transmission of messages from the mobile units to the stationary system. By means of only these two frequencies a communication system may be established that completely eliminates the limitations from which prior-art system suffer today. In addition, transmissions to the stationary system can be effected without time delay in conjunction with the occurrence of a particular incident, since without delay the central unit can receive information on for example when a bus leaves a stop or when a truck has delivered its charge. The system may be designed for coverage spanning from a limited area, such as a town, to a very large area, for example an entire continent.

Instead of transmitting a message along a designated carefully controlled communication path, the basic principle thus is to communicate the message with considerable redundancy by transmitting it repeatedly, and to arrange for reception of each transmission by radio receivers at several locations. This redundancy, i.e. a considerable surplus of information, efficiently ensures that at least one message with a high degree of probability reaches at least one receiver and in consequence thereof, the central unit.

This means, however, that a specific receiver unit is quite capable of perceiving transmissions from two or several vehicles simultaneously and an in doing so not receiving any one of the messages correctly. This is a quite deliberate consequence of the fact that all mobile units transmit messages on the same frequency without mutual co-ordination but this does not constitute a serious problem, as long as a transmission cannot be perceived by too many receiver units, since if this were the case the risk for interference would increase. Consequently, it is important to adjust the power of the transmitter and the location of the receiver units such as to ensure that only a suitable number of receiver units are capable of perceiving the message. By "suitable number" is to be understood a sufficient number to ensure sufficient probability of reception but at the same time sufficiently few to reduce the probability of interference. This "sufficient number" could vary, depending on how heavy the traffic of messages is within a specific area.

In an area where a large number of mobile units are moving about and many messages are transmitted (for example at a hub of a public transportation network) it is suitable to provide a large number of receiver units, each one of which is allowed to receive messages only from a comparatively small sector, for example by locating the receiver unit such that it is partly screened off by buildings and is close to the ground, or by utilising a directional aerial. In an area, where fewer messages are transmitted, for example in the countryside, it is suitable to position the receiver units at a higher level and preferably in an unobstructed position, for example by positioning the receiver unit in a GSM mast or the like.

Another factor affecting the number of receiver units that are capable of receiving a message is the power used to transmit the message. The power thus should not be of such a magnitude that too many receiver units are capable of perceiving the message.

It may also be advantageous to use variable transmission power. In an area, where many messages are transmitted, the power could then be reduced in order to prevent too many receiver units from perceiving the message. In an area, where few messages are transmitted, the power may be increased to ensure that the message is perceived by several receiver units. Information on suitable powers may be transmitted from the central unit or be gathered by means of a receiver in the mobile unit.

Thus, it is a matter of interplay between on the one hand the location of the receiver units and the design of the aerials, and on the other of the power of the transmission. These factors need to be adapted to ensure that a well-balanced number of receiver units are capable of perceiving each message that is transmitted.

Each receiver unit may be arranged to eliminate identical messages that it receives and to transmit to the central unit only one of the several identical messages received. In this manner the surplus of information data to the central is reduced. On the other hand it may be advantageous to transmit all messages to the central, for statistical purposes, in order to allow a picture to be formed on the operation and the coverage of the system.

In addition, each receiver unit may be arranged to identify erroneously received messages and to transmit only correctly received messages to the central unit. Error messages may occur, when two transmissions from two separate mobile units are received simultaneously in a single receiver unit and interfere with one another, or when the distance between a transmitting unit and a receiver unit is so large, that the reception is disturbed, and for instance the whole message is not perceived. These disturbed messages cannot be used for information purposes and therefore preferably are rejected in the receiver unit.

Each mobile unit may be arranged to transmit a message on one of several alternative frequencies, and the stationary part of the system in this case comprises mobile units designed to receive signals on these alternative frequencies. Preferably, different frequencies are then utilised for different capacity needs; for example, one frequency may be used for transmission of longer messages (in the magnitude of several hundreds of bytes). By equipping the mobile units with an additional receiver in addition to the broadcasting receiver, the mobile units can listen on frequencies employed to transmit longer messages. When a mobile unit is about to emit a longer message, such transmission could be preceded by a check to ensure that no transmission is in progress on the frequency about to be used. A brief message of attention is then transmitted followed by the message itself. If another unit in the neighbourhood starts to transmit a message of attention but notices that it has started to send this message of attention slightly after another unit has started to transmit, this unit interrupts, i.e. it postpones the transmission of its message, until again there is no activity on the frequency in question.

In accordance with another special embodiment of the invention, a mobile unit, by way of a short message via the usual transmission frequency, requests permission to send a message of a predetermined length. The central system is then aware of the whereabouts of the mobile unit and informs the unit that it is permitted to send its longer message on a predetermined stated frequency, starting at a certain time. Although the invention is primarily intended to eliminate the need for designated communication paths, it thus could also be applied as an improved method of establishing such designated communication paths. The allocation of time slots as indicated above may be effected quite dynamically, where information on transmission needs is communicated from the mobile unit via the common transmission frequency.

In accordance with a preferred embodiment of the invention, an acknowledgement in the form of a broadcast message is sent to a mobile unit in response to the reception by the central unit of a message from that mobile unit. This procedure may be advantageous in conjunction with messages of special importance, for instance that a truck has delivered a cargo at a particular address. The mobile unit (i.e. the truck in accordance with the above example) can then be arranged to again transmit the message, should no acknowledgement be received within a predetermined time. This acknowledgement procedure including repeat of the transmission offers a possibility of satisfactory security of communication when such security is necessary.

Radio communication from the mobile units may be established for instance in conjunction with the occurrence of an incident in the mobile unit. If the mobile units are vehicles in a public transportation system, they thus are able to send message as they arrive to or leave a stop.

The mobile units could also be portable units of pager type, which in a manner already known may be contacted by means of broadcasting but which in accordance with the invention are able to send messages back to the central unit in a simple and cost-efficient manner. Also handheld computers and similar units may be fitted with a radio communication unit and be made part of a system in accordance with the invention.

The data communication network preferably comprises a packet conveying data communication network, such as the Internet, wherein the receiver units may be permanently connected to the Internet. This is an economically more attractive way of realising the invention. The receiver units may also utilise the data communication network in a GSM system.

BRIEF DESCRIPTION OF THE DRAWINGS

The present invention will be described in more detail in the following with reference to the accompanying drawings, which for exemplifying purposes will show a preferred embodiment of the invention.

FIG. 1 is a general view of a system in accordance with one embodiment of the invention.

DETAILED DESCRIPTION OF A PREFERRED EMBODIMENT

Figure 3:
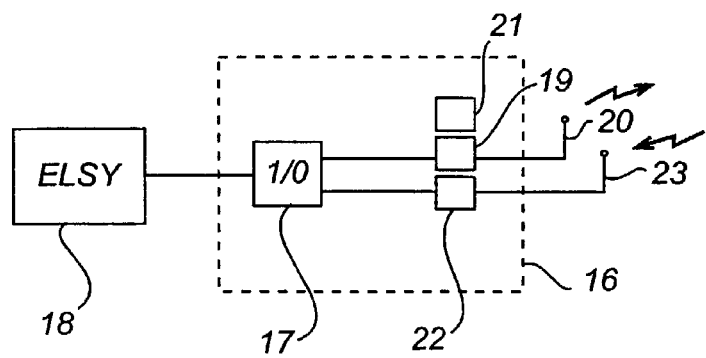
FIG. 3 is a schematic view of a device with which is fitted the vehicle of FIG. 1.

The invention will be described in the following with reference to a system for public transportation. This is but one of several possible applications and should not be regarded as a limitation of the scope of the invention as defined in the appended claims.

The system shown in FIG. 1 comprises a central unit 1, which so to say forms the hub of the communication system. The central unit 1 comprises communication means 2 enabling it to be connected with one or several stationary transmitter units 3, which are located in e.g. radio masts 30, 31. The transmitters are arranged to transmit, on one frequency or alternatively several alternating frequencies and in different time slots, radio messages 4 over an area, such as the area surrounding a GSM mast, a town or a region (so called broadcasting). The transmission power is adapted to ensure that an emitted radio message 4 may be received by vehicles present within a predetermined area. The connection between the central unit 1 and the transmitting units 3 may consist of a data communication network connection, such as an Internet connection 9, or some other suitable communication path 8 that couples the transmitter unit directly to the central unit. The essential feature is that the central unit 1 is able via the connection 8, 9 to convey messages to be sent to the vehicles 6 and to determine the order of priority for broadcasting these messages. Preferably, the central unit 1 is a data processing centre also comprising storing and processing means 10 for generating and processing messages. Although in this description only one single central unit is mentioned, it is obvious that it could consist of several units that are interconnected in any suitable manner, should this be required, for instance in consideration of the traffic of messages from the mobile units.

The system further comprises a comparatively large number of receiver units 12, which are dispersed over the intended area of coverage by the system. These receiver units comprise means for connection to a data communication network, by means of which the receivers communicate with the central unit 1. The receiver units may comprise e.g. means 13 permanently connecting them to the Internet or some other package-conveying network 14. The data communication network could also comprise e.g. a data communication network intended for a GSM system, in which case receiver units 12 may be positioned in GSM masts 31 and employ communication channels between the GSM system base stations in order to transmit received messages to the central unit 1 (see FIG. 2).

In addition, each receiver unit 12 comprises a radio aerial designed to perceive messages that are transmitted from a vehicle. The aerial may be a directional aerial monitoring only a limited sector of the area around the receiver unit 12. Several receiver units of this kind may be arranged together for the purpose of thus dividing up an area into several sectors. Such a collection of receiver units 12', i.e. in principle a set of sectorially separated directional aerials each one of which has a radio receiver connected thereto, may be located at a high level, for instance in a mast 30, 31 to provide sectorially separated coverage of a comparatively far range (see FIG. 2).

Receiver units 12 that comprise a radio receiver 15 and software and hardware 13 allowing a permanent connection with the Internet to be established, may be manufactured today at a very low price and therefore may be dispersed in large numbers in the intended area of coverage of the communication system. To avoid that receiver units are too easily accessible in public places, property owners (private as well as enterprises) may be used and the property owner be offered a connection to the Internet on a cost-share basis with the operator of the communication system in question.

Figure 2:
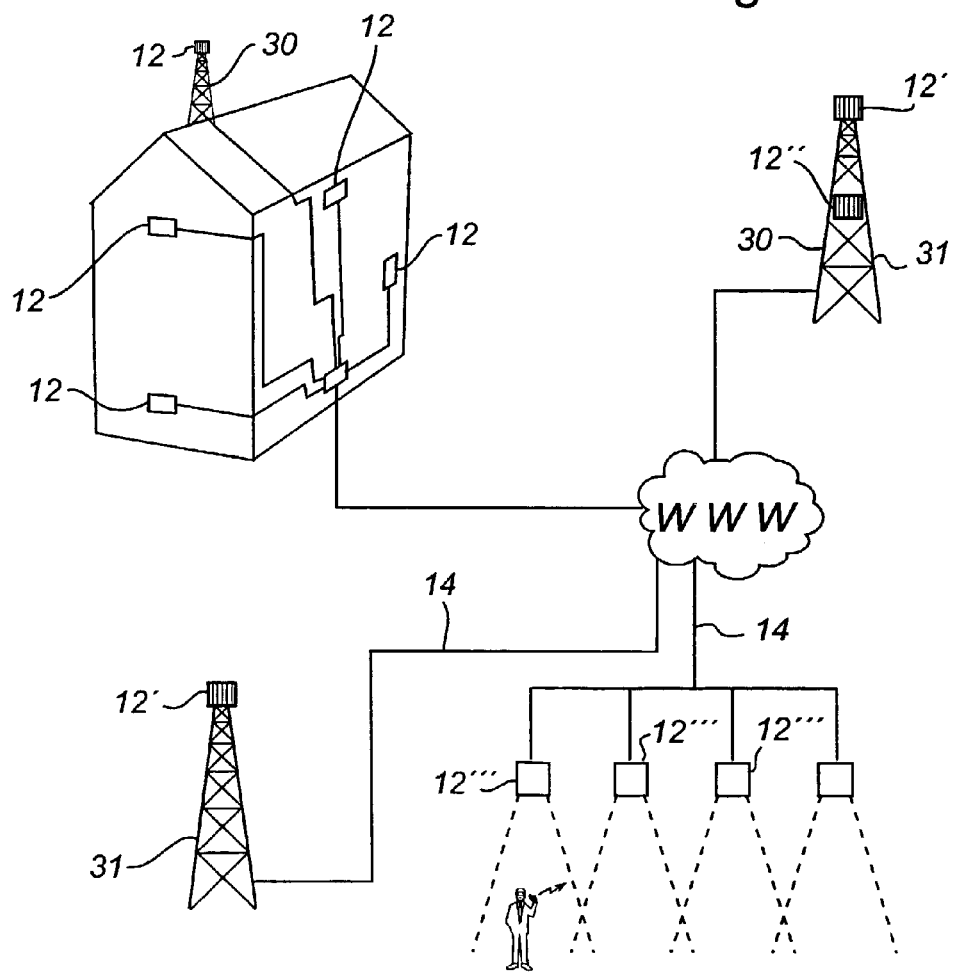
FIG. 2 is a schematic view of possible locations of the receiver units shown in FIG. 1.

In apartment houses cheap Internet connection facilities are nowadays often available and for this reason it may be suitable to use these premises based an agreement with the tenants or the house owners. It is advantageous to position the receiver units 12 at different levels and with different aerial directions. Several receiver units therefore may be located inside the building, on different sides and at different levels, and in roof-mounted masts, and they may be connected to the Internet, as shown in FIG. 2.

A possible scenario for extension of a communication system according to the invention is to start by placing receiver units 12', having sectorially separated listening areas, in for instance GSM masts 31 existing within the area. These units 12' provide satisfactory geographic coverage, wherein each receiver unit 12' essentially listens to a plurality of elongate sectors.

When the number of mobile units increases, for example when several transportation companies are to use the system simultaneously, the collision risks increase, i.e. a receiver perceives several messages simultaneously and therefore cannot receive any one of the correctly. It is then suitable to extend the system with more receiver units 12" of the same kind as units 12' but positioned closer to the ground, for example further down along the mast 31. Therefore, the reception area of their aerials becomes smaller than that of the unit 12'. In addition, further receiver units 12 may be located in other places, for instance on rooftops and the like, particularly in the areas where the number of vehicles is the highest.

In the next stage, when the traffic of messages becomes more intensive still, receiver units 12 may be provided in several places in a building, in the manner described above, and for instance in alleys in the like. Each such unit is to have a comparatively limited reception area to ensure that the risks that the messages collide with one another is kept at an acceptable level. The reception area may be restricted by location and/or by directional aerials.

In a further step which is suitable above all inside for instance shopping centres or large-area conference halls, it is possible to locate downwardly directed receiver units 12''' for instance in the ceiling. The reception area of these units is limited to a small radius and therefore they are capable of serving an area within which a large number of mobile units are present, for example portable communication units. A system in accordance with the invention having this high degree of resolution could be used by portable units 6' of GSM telephone type as a complement to communication on dedicated channels. One example of application is when a specifically established communication path of GSM type is needed only sporadically. It could be a matter of less sophisticated Internet traffic of WAP type or paging systems including acknowledgements. By comparatively simple means, a mobile telephone could be supplemented by a radio transmitter/receiver in accordance with the invention, allowing it to then to be used in a mobile Internet via the radio communication system in accordance with the invention.

The central unit 1, the broadcasting transmitter units 3, the receiver units 12 and the data communication network 8, 9, 14 together form the stationary part of the communication system.

The device 16, shown schematically in FIG. 3, comprises a first data communication unit (I/O gate) 17, which communicates with the internal information system of the vehicle, for example a KomFram system and/or an ELSY system delivered by AB Thoreb. This unit 17 is connected to a radio transmitter 19, which via a first aerial 20 transmits on a specific carrier frequency. The radio transmitter could for example correspond to the transmitter part of a radio modem of the Satel brand. In addition, a control unit 21 is connected to the radio transmitter 19 for the purpose of making the transmitter to repeatedly emit a message that is transferred from the I/O gate 17.

The device 16 further comprises a radio receiver 22, for example of the same type as an Ermes receiver arranged to receive via a second aerial 23 messages 4 broadcast by a stationary emitter unit 3. The receiver 22 is connected to the data communication unit 17, allowing received messages to be transferred to the internal information system 18 of the vehicle.

The function of the system will now be described.

When a message 4 is to be communicated to one or several vehicles in the system, the central unit 1 conveys the message via connection 8,9 to a transmitter unit 3 in the area, where the vehicle is present. All vehicles 6 in the area receive the message by means of receiver 22 and transmit it via the I/O gate to the internal communication system 18, which processes it in accordance with predetermined routines.

A broadcast message 4 could for instance contain information to be used by all vehicles in the system, such as corrective data for the GPS units of the vehicles. Alternatively, the information could be intended for one specific vehicle or for a limited group of vehicles, and in such cases, the message preferably contains an address in the form of vehicle-identification data or group identification data. The address can be read by software in the device, and only messages intended for the vehicle in question are forwarded to the information system. Alternatively, all received messages are transmitted to the information system, which in turn decides whether a message is intended for the vehicle.

This part of the system, i.e. radio communication from the central unit to the vehicles, is well known and does not form part of the invention. Broadcasting transmitters forming part of the Telia Minicall system and the Ermes paging system, for example operate in a similar manner.

In the following will be described how a message 25 is transmitted from a vehicle 6 to the central unit. The message could be incident controlled, the vehicle reporting for example that it has left or arrived at a stop, or time controlled, the vehicle reporting for example its position every minute. The message is generated in the internal information system 18 of the vehicle and contains e.g. data on the identity of the vehicle, the present time, the present position, a current incident, and so on. The message 25 is supplied to the emitter 19 via the I/O unit 17. The control unit 21 thus makes the transmitter 19 emit the message a predetermined number of times at predetermined but preferably random intervals. For example, the control unit is arranged to cause the sender to emit the message several times within a predetermined period, for example three times during the same number of seconds, but these parameters are best determined by the expert for each individual application.

In one embodiment, the transmitter 19 also comprises a receiver part, which listens to messages emitted from other vehicles or other mobile units in the vicinity. The primary purpose is to gather information on the number of messages emitted per time unit in the area, in which the vehicle is present. This information is conveyed to the control unit 21, which in this case is arranged to regulate the transmitter power. This allows the message to be transmitted at a lower power when the traffic of messages. is heavy in the area and at a higher power when the traffic of messages is sparse in the area.

Emitted messages are received by several receiver units 12, the latter forwarding the messages to the central unit1 via the data communication network 14. Each receiver unit may then be arranged to eliminate identical messages and only forward one of several identical messages received. Even in this case several receiver units may forward identical messages to the central unit, the latter therefore being arranged to select one of several identical messages. The information contained in the message is read by software 26 in the central unit 1 and normally it is forwarded to another system 28 communicating with the central unit. The information could concern e.g. the exact position of the vehicle, current observance by the vehicle of the timetable or information on internal conditions of the vehicle.

Information on the number of identical messages that have been received may be utilised for statistical purposes, in order to provide a picture of the coverage of the communication system.

Since several vehicles are equipped with transmitters emitting on a common frequency it may happen that a receiver unit perceives several messages simultaneously, causing interference of the messages, which therefore cannot be received correctly. Preferably, the receiver units are arranged to be able to determine when a message is received correctly and to convey only such correct messages to the central unit. The check function could for example comprise a parity bit check or the like.

In order to further improve the odds that a burst of messages result in at least one correctly received message, the control unit could be arranged to transmit messages only at predetermined time intervals of varying length. By synchronising all vehicles of the system, for example by means of GPS controlled clocks, this means a transition from a continuous time space in which the messages may be transmitted at any moment to a discrete time space in which the messages are transmitted only at predetermined moments. Owing to this arrangement the messages will not overlap "somewhat" but instead overlap completely or be entirely separate.

In a system in accordance with the invention, it may in some cases be advantageous to utilise several frequencies, for example if the mobile units need not transmit messages exceeding a predetermined length. Such longer messages may then be transmitted on another frequency and the receiver units 12 may be provided with double receivers 15. If the above time-division method is made use of, one of the frequencies is divided into brief slots and the other one into longer slots. When needed, the traffic on the smaller-slot frequency could be regulated by an inquiry procedure, according to which one vehicle 6 requests permission on the first frequency to transmit a longer message and receives confirmation via broadcasting that a specific time slot is free for transmission over the second frequency. In this case, the first frequency serves to produce dynamic allocation of time slots over the second frequency. The receiver units belonging to the respective frequency must not necessarily coincide; on the contrary, it may be suitable to establish two parallel receiver networks having different divisions of coverage.

In order to improve security in some types of message, such as transmissions of information on completion of a commission, a procedure of acknowledgement may be devised in a system of the kind defined above. In such cases, the information system 18 in such cases provides a message 25 to be acknowledged with a data sequence that may be read by the central unit 1. The central unit 1 or the system 28 of the current party is also arranged, upon identification of such a sequence, to transmit a message of acknowledgement addressed to the vehicle 6 in question, by broadcasting over the associated broadcast transmitter 3, which message is received by the vehicle 6. The vehicle information system 18 may also be arranged to repeat the message within a predetermined period, should no acknowledgement have been received.

Parts of some messages could of course be encoded, should this be needed, in which case the vehicle 6 and the central unit 1, respectively, are provided with hardware and/or software adequate for the purpose.

Although the invention is primarily intended for radio communication with mobile units, the described system of course also permits inclusion therein of stationary units, such as traffic lights, parking meters, or units located at stops to allow passengers to make inquiries on expected times of departure, etcetera.

The above communication system, described herein with reference to public transportation systems, could advantageously be used also by other traffic parties such as taxi transportation companies, in regular need of information on the whereabouts of free taxi cars or emergency vehicles that must be able to regularly give reports on their position or the current status of a patient, and so on. In a simple manner, several parties 28 may be connected to the same network via communication with the central 1, by means of which they are able to transmit information to vehicles forming part of their fleet of vehicles, or to receive information from the vehicles. Alternatively, the parties may be connected to the data communication network 14 and in this manner communicate with the central 1 and/or other parts of the stationary part (transmitter units 3 and receiver units 12) of the system. In the manner described above, also portable mobile units, such as handheld computers may be supplemented with a radio communication system in accordance with the invention and be included in the system.

This is particularly advantageous when the data communication network includes the Internet. In this case the central unit 1 may convey messages to other parties 28 and when one of these parties wishes to transmit a message it is transferred to the central, which via at least once emitter unit 3 broadcasts it to vehicles 6 in the area. Because all messages from the vehicles pass the central 1, the latter receives an enormous amount of data on the traffic situation. Such data may be utilised by motorists, authorities, emergency vehicles, and so on, for instance via the Internet or via mobile units in the system.

The details of the design of the radio and data communication system is best left to the expert, who should have no problems in designing a system operating in accordance with the description above. The system preferably is realised as a combination of hardware and software, the expert being the best judge of which solutions are the most adequate. This is true also as regards the choice of frequencies, time intervals, contents of information, and so on.

The invention claimed is:

1. A method of radio communication between a plurality of mobile units and a stationary system, wherein the stationary system includes at least one stationary receiver unit arranged to receive, on a public frequency, messages from said mobile units, radio communication from the mobile units, comprising:

transmitting, from a mobile unit on said public frequency, at least one radio message intended to be receivable only by a small number of said at least one receiver unit, without establishing a designated communication path; and receiving one or several of said messages in said small number of receiver units, and from at least one of said small number of receiver units, forwarding to a central unit, via a data communication network, at least one received message.

2. A method as claimed in claim 1, wherein a plurality of identical messages are transmitted from the mobile unit.

3. A method as claimed in claim 2, said method further comprising the step of eliminating in each receiver unit identical ones of received messages and of forwarding only one of several identical messages received to the central unit.

4. A method as claimed in claim 1, said method further comprising listening, in the mobile unit, to messages transmitted from other mobile units, and adapting the transmission power of a message transmitted from the mobile unit in consideration of the number of messages received per time unit.

5. A method as claimed in claim 1, said method further comprising receiving, in the mobile unit, information from the central unit regarding the suitable transmission power range.

6. A method as claimed in claim 1, said method further comprising identifying, in each receiver unit, erroneously received messages, and of only forwarding correctly received messages to the central unit.

7. A method as claimed in claim 1, wherein radio communication from the mobile units takes place in conjunction with the occurrence of an incident in a mobile unit.

8. A method as claimed in claim 1, wherein the mobile units are vehicles in a public transportation system that transmit messages as they arrive to or leave a stop.

9. A radio communication system comprising:
a stationary part and
a plurality of mobile units,
wherein the stationary part of the radio communication system includes at least one stationary receiver unit for reception of radio signals, said units being connected to a central unit via a common data transmission network, and in that each mobile unit is provided with means for transmitting a message on a public frequency, without establishing a designated communication path, said message being adapted to be perceivable only by a small number of said at least one receiver unit,
said stationary receiver unit being arranged to receive messages transmitted by mobile units within a limited area, and to forward said messages to the central unit via said data transmission network.

10. A radio communication system as claimed in claim 9, wherein each stationary receiver unit owing to its location and to the design of its aerial is arranged to receive messages transmitted by mobile units within a limited area.

11. A radio communication system as claimed in claim 9, wherein the receiver units are arranged to eliminate identical ones of received messages and to forward to the central unit only one of several identical messages received.

12. A radio communication system as claimed in claim 9, wherein the receiver units are arranged to identify erroneously received messages and to forward to the central unit only correctly received messages.

13. A radio communication system as claimed in claim 9, wherein each mobile unit is provided with means for transmitting a message on several alternative frequencies and wherein the stationary part of the system comprises receiver units intended to receive signals on said alternative frequencies.

14. A radio communication system as claimed in claim 9, wherein said means are arranged to listen to messages transmitted from other mobile units on the transmission frequency concerned.

15. A radio communication system as claimed in claim 9, wherein said means are arranged to receive information from the central unit concerning the suitable power span.

16. A radio communication system as claimed in claim 9, wherein said data transmission network comprises the Internet.

17. A radio communication system as claimed in claim 9, wherein the mobile units are vehicles.

* * * * *